(No Model.)
J. H. THOMAS.
HAY TEDDER.
No. 316,498. Patented Apr. 28, 1885.
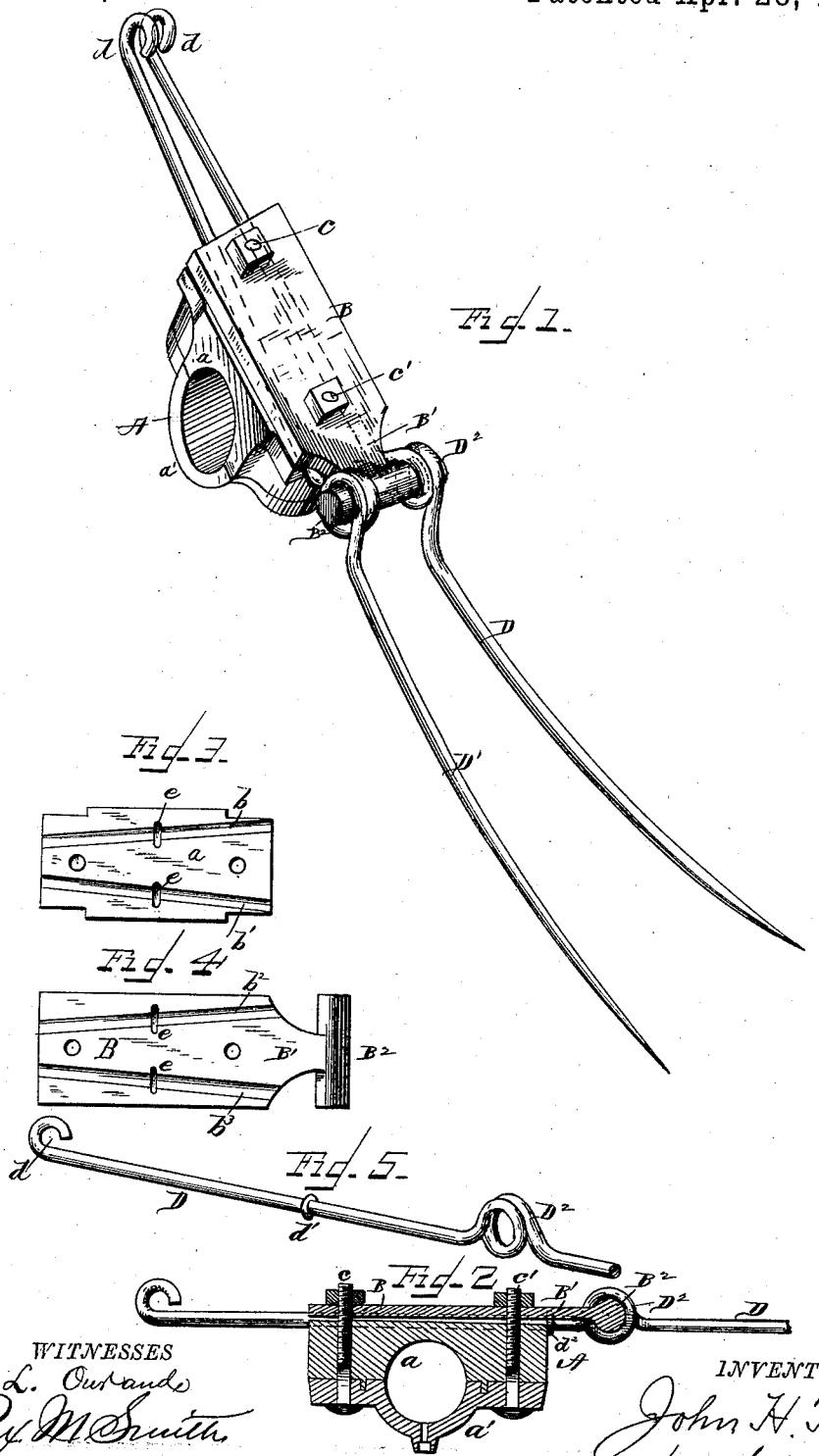
WITNESSES
INVENTOR
John H. Thomas
by A. M. Smith
Attorney

UNITED STATES PATENT OFFICE.

JOHN H. THOMAS, OF SPRINGFIELD, OHIO.

HAY-TEDDER.

SPECIFICATION forming part of Letters Patent No. 316,498, dated April 28, 1885.

Application filed July 31, 1884. (No model.)

*To all whom it may concern:*

Be it known that I, JOHN H. THOMAS, of Springfield, county of Clark, and State of Ohio, have invented a new and useful Improvement in Hay-Tedders, of which the following is a full, clear, and exact description, reference being had to the accompanying drawings, making part of this specification.

This invention relates to the construction of the fork crank-boxes and teeth or fingers and to the manner of securing the latter to the boxes, whereby they are adapted to be set and securely held in uniform relation to the crank-boxes and shaft, and will be readily understood from the following description with reference to the drawings, in which—

Figure 1 is a perspective view of a tedder-fork or pair of fingers and of the crank-box to which the same are attached. Fig. 2 represents a section through the crank-box between the fingers. Fig. 3 is a plan view of the side or face of the crank-box proper, to which the teeth or fingers are attached; and Fig. 4 is a similar view of the inner adjacent face of the cap-plate for uniting the fingers to the crank-box; and Fig. 5 is a perspective view of a portion of one of the teeth or fingers detached.

The machine in its general arrangement of parts may be like that shown and described in another application for a patent of even date herewith, or to others in common use, and need not be herein described further than to say that, by preference, it is of that class in which the forks are actuated by a series of cranks on a shaft arranged in rear of and parallel with the axle, and geared to and actuated from the carrying-wheels on said axle.

A represents the crank-box, through which the tedder-fork teeth or fingers are connected with the actuating crank, said box by preference being made in three parts, $a$, $a'$, and B, $a$ and $a'$ constituting the box proper, each provided with a half-box or semi-cylindrical groove or recess, adapting them together to surround the actuating-crank. The part $a$ has semi-cylindrical grooves $b\ b'$, formed in its upper or outer face, said grooves extending from end to end and by preference made to diverge toward the lower end for giving the proper spread to the fingers at their lower ends and for bringing their upper ends together, as shown in Fig. 1, to adapt them to be united directly to the same vibrating link or links. The part or cap-plate B is similarly grooved on its adjacent face, as shown at $b^2\ b^3$, Fig. 4, and when united to the part $a$ by means of bolts $c\ c'$, which also unite the two parts $a$ and $a'$ of the box, serves to clamp the teeth or fingers D D' firmly to the box.

The grooves may be omitted, either in part $a$ of the box or in the cap-plate B.

The teeth or fingers are formed each in a single piece provided at their upper ends each with an eye or eyes, $d$, through which to connect them to the swinging links or radius-bars, and at a suitable distance below said ends with ribs or collars $d'$, which may be formed upon the teeth or fingers, or they may be made separate therefrom and afterward shrunk upon or otherwise united thereto in any suitable manner, and the adjacent faces of the box or part $a$ and cap B have suitable sockets, $e$, formed in them for the reception and retention of said ribs or collars.

By forming or securing the collars $d'$ upon the teeth or fingers at uniform distance from the ends, and the sockets $e$ in uniform relation to the crank-boxes, the said collars and sockets are made to determine the relation of the teeth to the crank-shaft in setting or applying the teeth, and serve to insure their uniform relation thereto. They also serve to prevent the slipping or endwise displacement of the forks in case the clamping cap-plate should accidentally become loosened.

The sockets $e$ may be dispensed with, and the ribs or collars arranged to abut against the upper or lower end of the crank-box, as shown at $d^2$, Fig. 2. This construction would insure the uniform setting of the teeth, but would not so effectually prevent their displacement, and the construction first described is therefore preferred. The same result may be attained by extending the cap-plate B beyond or below the crank-box proper in the form of a tapering stem or shank, B', upon the end of which is formed a cylindrical cross head or bar, B², the ends or spurs of which enter and are surrounded by coils D² in the fork-fingers D D', as shown. This construction serves not only to determine the relation of the forks to the crank-boxes and cranks, but also to prevent displacement of the fingers, and may be employed either with or independently of the collars $d'$. Where the cross-head $B^2$ is employed it serves to give greater steadiness to the action of the fingers by resisting undue springing or contraction of the coils, and where the cross-head is dispensed with it is preferred, ordinarily, to also dispense with the coils in the teeth.

Having now described my invention, I claim as new—

1. In a hay-tedder, the fork-tines made each in a single piece, in combination with a grooved crank-box and clamping-plate for uniting them to the crank, and means, substantially as described, for preventing endwise movement of the tines.

2. The crank-box provided with grooves diverging downwardly, in combination with a similarly grooved clamping-plate for uniting the tedder-tines to said crank-box, substantially as described.

3. The crank-box provided with grooves for the reception of the fork-tines and a similarly grooved plate or cap for clamping the tines to said box, in combination with means, substantially as described, for gaging the setting and preventing endwise movement of said fingers.

4. The tedder-fork tines formed each in a single piece provided with an eye for attachment to the swinging link or radius-bars, in combination with grooved crank-boxes and means for uniting the tines directly to said boxes and preventing their displacement, substantially as described.

5. In a hay-tedder, the crank-box provided with the diverging grooves and recesses and the similarly-grooved clamping and recessed cap-plate for uniting the forks to said box, in combination with fork-tines provided with ribs or collars, substantially as described.

6. In a hay-tedder, the grooved crank-box, in combination with the grooved clamping-cap provided with the cylindrical cross head or bar for uniting the fork-tines to said box, substantially as described.

In testimony whereof I have hereunto set my hand this 29th day of July, A. D. 1884.

JOHN H. THOMAS.

Witnesses:
H. H. BEAN,
A. D. CRANE.